United States Patent
Hunyar

[11] 3,868,849
[45] Mar. 4, 1975

[54] DUCTILITY TESTER
[75] Inventor: Csaba K. Hunyar, Sunland, Calif.
[73] Assignee: United Artists Music and Records Group, Inc., Los Angeles, Calif.
[22] Filed: Aug. 16, 1973
[21] Appl. No.: 388,727

[52] U.S. Cl. .................................................. 73/100
[51] Int. Cl. ............................ G01n 3/20, G01n 3/28
[58] Field of Search ......... 73/87, 100; 225/100, 101

[56] References Cited
UNITED STATES PATENTS
2,934,945   5/1960   Geenen et al. ........................ 73/100
3,636,758   1/1972   McKee et al. ........................ 73/100

FOREIGN PATENTS OR APPLICATIONS
185,253   9/1922   Great Britain ........................ 73/100

Primary Examiner—James J. Gill
Assistant Examiner—Anthony V. Ciarlante
Attorney, Agent, or Firm—William W. Haefliger

[57] ABSTRACT

A thin strip ductility tester operates to stretch wrap the strip partially about a curved surface.

10 Claims, 3 Drawing Figures

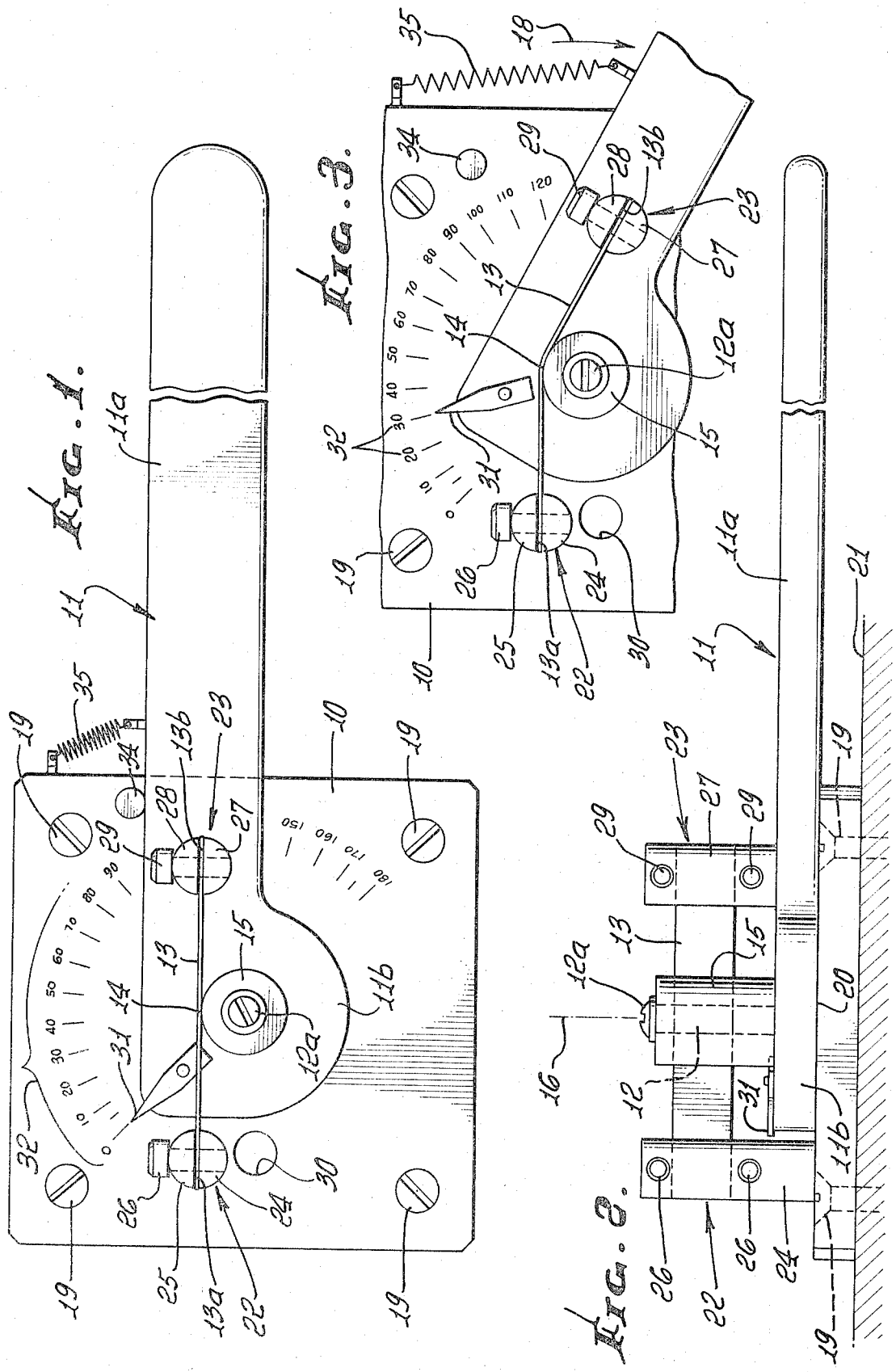

3,868,849

DUCTILITY TESTER

BACKGROUND OF THE INVENTION

This invention relates generally to ductility testing, and more particularly concerns highly useful testing equipment to determine ductility of specimens such as electroplated deposits.

Ductility is one of the most important properties of electroplated deposits. It is therefore essential that ductility of such deposits be measured whether they are extremely thin, as in decorative coatings, or thicker as for example for structural purposes. Several methods are known to test thin electroplated deposits for ductility, as listed in ASTM Methods. One method tests the ductility of thin electroplated deposits over a base metal which must be more ductile than the deposits. This is the case when, either for corrosion protection or for decorative purposes, base metals such as copper, steel, etc. are overcoated with a thin (usually less than 1½ mil thick) single or multiple electrodeposit. Thin electrodeposits are also formed as foils without an underlaying base carrier, and such foils may be also tested by ASTM methods. None of these methods are suitable, however, for heavier deposits made without a base metal. Such deposits are usually employed for structural purposes (for example: dies, phonograph record matrixes, etc.).

The usual tensile strength testing procedure employs a specimen pre-machined into a certain form, clamped between the jaws of a vice-like holder and subjected to tensile stress by pulling the jaws apart. The recorded data indicate tensile stress versus elongation. If the application of stress is stopped before breaking and the stylus returns to the starting point, or on a point on a curve, only elastic deformation occurred during the application of tensile stresses. If the stylus does not return to a point on the original curve, permanent deformation occurred. If the test is continued to such a stress that the specimen breaks, then the ultimate elongation can be read from the chart which is a direct measurement of the ductility of the electroplated deposit. Conventional instrumentation, though quite accurate, is normally too expensive for acquisition by average electroplating shops. Accordingly, there is a need for a ductility tester characterized by extreme simplicity, good repeatability, high accuracy, and capable of operation by completely untrained personnel.

SUMMARY OF THE INVENTION

It is a major object of the invention to provide a ductility tester overcoming the above problems and meeting the described need.

Basically, the tester of the invention comprises a base or support; post means (as for example a cylindrical body or sleeve) projecting at one side of the support and having a curved surface presented for engagement by the specimen strip; an arm member pivotally connected to the support; and holder means on the support and on the pivoted arm member to grip and effect stretch wrapping of the strip partially about the curved surface in response to relative forward pivoting of that member with respect to the support. A marker on one of the support and arm member progressively registers with indicia on the other of the support and arm member to indicate elongation.

Additional objects include the provision for use of different diameter posts or sleeves; and the provision of holders in the form of adjustable clamps located to grip opposite end portions of the strip, with the clamp on the support shiftable to different positions to accommodate to different diameter sleeves.

These and other objects and advantages of the invention, as well as the details of an illustrative embodiment will be more fully understood from the following description and drawings.

DRAWING DESCRIPTION

FIG. 1 is a top plan view of a ductility tester embodying the invention;

FIG. 2 is a side elevation showing the FIG. 1 tester; and

FIG. 3 is a fragmentary top plan view of the tester following handle rotation.

DETAILED DESCRIPTION

As seen in the drawings, the tester includes a base or support 10 to which a member 11 is pivotally connected, as by means of a fastener 12. The member 11 may comprise an arm having a handle 11a and a portion 11b overlying the support. Arm portion 11b engages the support at interface 20.

The specimen strip to be stretched is indicated at 13 in FIG. 1 as having initial tangential face-to-face engagement at 14 with the curved surface of a cylindrical sleeve 15. The latter may be generally characterized as a form of post means projecting at one side of the support, and also at the upper side of arm portion 11b. The sleeve is removably retained in position by the head 12a of the central fastener. The arm defines a pivot axis 16 which extends coaxially with, or is in registration with, the sleeve or post means.

Holder means is provided on the support 10 and on the pivoting member 11 to grip and effect stretch wrapping of strip 13 partially about the curved surface of the sleeve 15, in response to relative forward pivoting (in the direction of arrow 18 in FIG. 3) of the arm member 11 relative to the support. In this regard, the latter may be attached as by fasteners 19 to a table 21. Such holder means may, with unusual advantage, take the form of a first clamp 22 on the support, and a second clamp 23 on the arm member, the clamps located to grip opposite end portions of the strip 13. Clamp 22 includes a fixed jaw 24 projecting from the support to which it is attached, and a movable jaw 25 which engages the strip end portion 13a and urges it against the fixed jaw. Screw fasteners 26 located above and below the strip end portion 13a pass through jaw 25 and threadably engage jaw 24, for releasably holding the two jaws in clamping engagement with the strip. Similarly, the second clamp includes a fixed jaw 27 projecting from member 11 to which it is attached, and a movable jaw 28 engaging the strip end portion 13b, urging it against the flat surface of jaw 27. Screw fasteners 29 are located above and below the strip end portion 13b and pass through the jaw 28 for threadably engaging jaw 27, thereby releasably holding the two jaws in clamping engagement with the strip. The two jaws of the first clamp 22 may alternatively be selectively located above opening 30 in the support, to penetrate that opening for retention by the support, in the event for example that a much smaller diameter sleeve 15 is employed.

An indicator arm or marker is provided for example at 31 on the arm to progressively register with indicia 32 on the support, in response to relative rotation of the arm and support. Since in the tensile or elongation test the specimen shape and size is unimportant, the testing equipment will accommodate strip plating thicknesses from 1 to approximately fifty thousandths inch, although the scope is not limited within this range since a slight modification, thinner foils, or heavier sheets can be also tested. It is important that when the pivoted arm member 11 is returned to the starting position of engagement with stop 34 and the specimen strip is inserted and affixed to the holding jaws, the specimen should touch the center pivoting sleeve 15 tangentially; therefore, if the sleeve is exchanged to a smaller or larger diameter one, the first clamp 22 on the support should be transferred to another hole (as at 30) lower or higher to assure that the specimen is tangentially touching the center sleeve. The specimen should be inserted in the clamp holder straigth without wrinkles, but also without any undo stretching. A small spring 35 can be used to hold the arm 11 against the stop 34 while the clamps are being loaded with the specimen.

By rotating the pivoted arm member as by handle 11a, stretch is applied to the specimen and the indicator will show the degree of the rotation. When the tensile stress so applied exceeds the strength of the material, it will break and the reading at that moment will indicate that degree of rotation of the pivotable arm member necessary to break the specimen. By simple mathematical calculations, the amount of stretch at that point can be calculated. If the length of the specimen at original position between the inner ends of the clamps is known and the diameter of the center pivoting sleeve 15 is selected so that a certain relation is calculated, then each degree of the rotation at the time of breaking will correspond to a certain elongation. This elongation is then the numerical value of the ductility of the tested specimen. It is practical to mount the support 10 to a non-moveable surface like the top of a bench, and apply the stretch slowly and evenly. Tests indicate that after a few trials one is able to get very repetitive and accurate results.

The relationships in one actual testing device are such that if the specimen measures 2 inches long between the inside edges of the clamps 22 and 23, and the diameter of the central sleeve is 0.764 inches, then each 3° of rotation of the arm member 11 will correspond to 1 percent elongation of the specimen. For example, if the specimen broke at 27° of rotation, then the elongation at the time of break was 9 percent.

The elongation is independent of the specimen thickness and width. The testing specimen does not have to be cut or machined to any special size and thicknesses of a wide variety can be tested on the equipment. The only limitation regarding thickness and width is that the specimen may be inserted freely into the specimen holder and clamped securely. If quite thick specimens are used, it is practical to choose a narrower width so that the forces necessary to break the specimen will not be too great. It has been found that a longer length handle will provide a smoother and more even stress although good results are obtained with different handle lengths. Samples could be tested as received from plating processes or chemically treatments (for example, the effect of heat treatments at different temperatures on ductility can be studied). Also, since the specimen is not plated over a substrate, effects of the substrate on the ductility testing is eliminated.

The following formula can be used to calculate the specimen length versus the diameter of the central pivoting sleeve to give the value of degrees rotation corresponding to 1 percent of elongation.

% Elongation per degree = $D.\pi/L.3.6$ TM (1)

where
$D$ = diameter of central sleeve in inches
$L$ = length of specimen in inches
$\pi$ = 3.14159

The tester can be built to any size depending on the size of the specimens to be tested. A good practical design contemplates 2 inches specimen length between the inner sides of the clamps and 0.764 inch diameter sleeve producing a 3° rotation for every percent elongation Example:
$L = 2''$
$D = 0.764''$ $$(D \times \pi)/(3.6 \times L) = (0.764 \times 3.14159)/(3.6 \times 2) = 0.33\%$$

elongation per degree rotation or 3° rotation per percent elongation.

I claim:
1. In a specimen strip ductility tester, the combination comprising
   a. a support,
   b. post means projecting at one side of the support and having a circularly curved surface presented for engagement by the strip,
   c. a member pivotally connected to the support, said member comprising an arm having a pivot axis, the post means carried by the arm to rotate therewith in alignment with said axis and so the axis is approximately at the center of said curved surface, and
   d. holder means on the support and on said member to grip and effect stretch wrapping of the strip partially about said curved surface in response to relative forward pivoting of said member with respect to the support.

2. The combination of claim 1 wherein said arm has a handle.

3. The combination of claim 1 wherein said member defines a pivot axis which is in registration with said post means.

4. The combination of claim 1 including indicia on one of said member and support, and a marker on the other of said member and support to progressively register with the indicia in response to said relative rotation.

5. The combination of claim 1 wherein said post means includes a sleeve removably attached to the support and defining said curved surface.

6. The combination of claim 5 including the strip initially held in tangential face to face engagement with the sleeve by the holder means.

7. The combination of claim 6 including attachment structure on the support to removably attach said sleeve, as well as different diameter sleeves, to the support as aforesaid.

8. The combination of claim 5 wherein said holder means includes a first clamp on the support and a second clamp on said member, the clamps located to grip opposite end portions of the strip, the clamps extending generally parallel to the post, and including said strip retained by the clamps and having a length L related the sleeve outer diameter D approximately in accordance with the expression:

% elongation per degree of arm rotation = $d \cdot \pi/3.6L$ where $D$ and $L$ are measured in inches.

9. The combination of claim 8 including structure on the support to which the first clamp is selectively connectible in different positions relative to the post means and said second clamp.

10. The combination of claim 2 including shoulders on the support and arm to interengage and limit reverse pivoting of the arm relative to the support.

* * * * *